United States Patent
Agrawal et al.

(10) Patent No.: US 11,841,843 B2
(45) Date of Patent: *Dec. 12, 2023

(54) SYSTEMS AND METHODS FOR MANAGING CONCURRENT DATA REQUESTS

(71) Applicant: Walmart Apollo, LLC, Bentonville, AR (US)

(72) Inventors: Gaurav Agrawal, Santa Clara, CA (US); Mingfeng Gong, Sunnyvale, CA (US); Deiva Saranya Mandadi, Sunnyvale, CA (US); Sandeep Singh, Sunnyvale, CA (US); Tuo Shi, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,819

(22) Filed: Jul. 21, 2022

(65) Prior Publication Data

US 2022/0358112 A1    Nov. 10, 2022

Related U.S. Application Data

(63) Continuation of application No. 17/108,315, filed on Dec. 1, 2020, now Pat. No. 11,429,585.

(51) Int. Cl.
*G06F 16/23* (2019.01)
*G06F 16/22* (2019.01)
*G06F 16/245* (2019.01)

(52) U.S. Cl.
CPC ...... *G06F 16/2343* (2019.01); *G06F 16/2237* (2019.01); *G06F 16/2255* (2019.01); *G06F 16/245* (2019.01)

(58) Field of Classification Search
CPC ............ G06F 16/2237; G06F 16/2255; G06F 16/2343; G06F 16/245; G06F 16/957; G06F 16/9574
See application file for complete search history.

(56) References Cited

U.S. PATENT DOCUMENTS

| 5,301,290 A | 4/1994 | Tetzlaff |
| 6,216,212 B1 | 4/2001 | Challenger |

(Continued)

FOREIGN PATENT DOCUMENTS

EP    2365442 A1    9/2011

OTHER PUBLICATIONS

Debnath, Biplob; "FlashStore: High Throughput Persistent KeyValue", 36th International Conference on Very Large Data Bases; Sep. 13, 2010, 12 pages.

(Continued)

*Primary Examiner* — James E Richardson
(74) *Attorney, Agent, or Firm* — Barta, Jones & Foley, PLLC

(57) ABSTRACT

In some embodiments, systems, methods, and apparatuses are provided herein useful for managing a plurality of concurrent and nearly concurrent data requests within a computer system. The systems have a main data storage for storing source data, and a high speed, and/or remote data storage for storing computed data. In some embodiments, a combination of data filters and distributed mutex processes are used to eliminate or limit duplicate reads and writes into the high speed data storage units by ensuring only a single service module gets a lock to do the read and update of the cache; and makes it possible for keys to expire and be removed from the data filter. The systems and methods herein have various applications including retail sales envi- (Continued)

ronments where the requested data is related to product sales, product availability and the like.

19 Claims, 4 Drawing Sheets

(56) References Cited

U.S. PATENT DOCUMENTS

| | | |
|---|---|---|
| 8,055,633 B2 | 11/2011 | Whyte |
| 8,812,651 B1 | 8/2014 | Eriksen |
| 8,849,812 B1 | 9/2014 | Mukherjee |
| 9,886,464 B2 | 2/2018 | Blanco |
| 9,959,279 B2 | 5/2018 | Archak |
| 11,044,258 B2 | 6/2021 | Zakharov |
| 11,429,585 B2 | 8/2022 | Agrawal |
| 2002/0198883 A1* | 12/2002 | Nishizawa .......... G06F 16/9574 |
| 2003/0018714 A1 | 1/2003 | Mikhailov |
| 2009/0019227 A1 | 1/2009 | Koski |
| 2010/0275209 A1 | 10/2010 | Detlefs |
| 2019/0339882 A1 | 11/2019 | Wallace |
| 2020/0279010 A1 | 9/2020 | Lenzner |
| 2022/0171758 A1 | 6/2022 | Agrawal |

OTHER PUBLICATIONS

USPTO; U.S. Appl. No. 17/108,315; Non-Final Rejection dated Dec. 20, 2021; (pp. 1-24).
USPTO; U.S. Appl. No. 17/108,315; Notice of Allowance and Fees Due (PTOL-85) dated Apr. 21, 2022; (pp. 1-10).

* cited by examiner

SYSTEMS AND METHODS FOR MANAGING CONCURRENT DATA REQUESTS

CROSS-REFERENCE TO RELATED APPLICATION(S)

This application is a continuation of U.S. patent application Ser. No. 17/108,315, filed Dec. 1, 2020, the disclosures of which is incorporated by reference herein in its entirety.

TECHNICAL FIELD

This invention relates generally to managing high volumes of data requests within computer systems that employ high-speed memory. In particular, the invention relates to managing concurrent and multiple data requests within computer systems having distributed high-speed memory, such as distributed cache memory.

BACKGROUND

High-speed memory is a chip-based computer component that makes retrieving data from the computer's memory more efficient. It acts as a temporary storage area that the computer's processor can retrieve data from easily. Cache memory, a form of high-speed memory, is a small-sized type of volatile computer memory that provides high-speed data access to a processor and stores frequently used computer programs, applications, and data. Because it is a temporary storage of memory, cache makes data retrieving easier and more efficient. It is the fastest memory type in a computer and is typically integrated onto the motherboard and directly embedded in the processor or main random-access memory (RAM).

In systems that employ cache memory, commands to write data into the cache, or "cache writes", are initiated when a user requests data that is not found or has been expired in cache. The cache must then establish or lock access to the main data store for the new information, and the request is fulfilled by reading and computing a response to the request based on information within the main memory or data store. The updated information is then written to the cache. In a highly concurrent environment, duplicate cache writes can occur when there are multiple requests for the same expired data in cache. Duplicate read and write commands are only one of the inefficiencies in distributed cache systems and is one of the most complex problems to solve at scale. Further, duplicate writes have the potential to degrade the availability of the service (e.g., website or other user application) facilitating the request, and in worse case scenarios, it can result in service downtime. This problem has different forms and has been referred to within the art as Cache Stampede, Thundering Herd, Sleeping Barber etc. Further, a cache miss (i.e., an event in which an application makes a request to retrieve data from a cache, but that specific data is not currently in cache memory) is a computationally heavy operation as then the service must load data from one or more main data storages and then run computations on the data to generate a response to the request.

In e-commerce (e.g., retail sales) applications that employ distributed cache (i.e., multiple cache memory storage units on different machines), optimized management of data requests is particularly critical. For example, during a product sale or airline ticket sale, hundreds of thousands, if not millions of entries for data within cache memory can expire or become invalid at the exact same time. Customers trying to access data (e.g., product price or availability) can create huge volumes of traffic consisting of concurrent or near concurrent requests for the very same expired entries within the cache. As a result, there may be millions of redundant read requests for access to the main datastores resulting in a corresponding number of write requests into cache, which stores the frequently accessed or computed data. This redundancy causes the system to respond slowly with the potential to temporarily make services and/or applications unavailable to customers or users.

BRIEF DESCRIPTION OF THE DRAWINGS

Disclosed herein are embodiments of systems, apparatuses, and methods pertaining management of a plurality of data requests. This description includes drawings, wherein.

Figure 1:
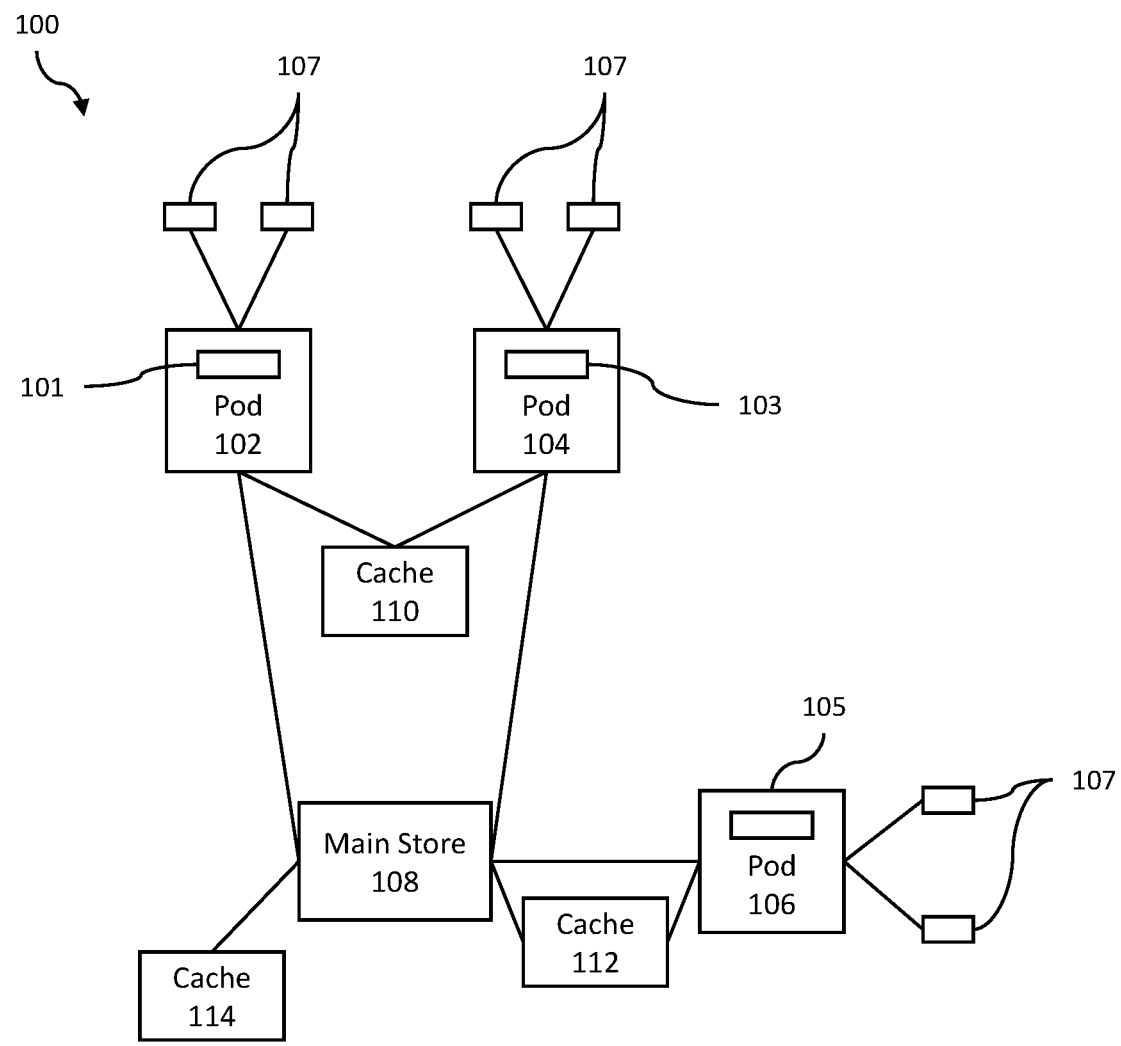
FIG. 1 is a block diagram of a high-level system for managing a plurality of data requests in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, devices, and methods are provided herein useful to manage high volumes of data requests within computer systems that employ high speed memory, such as cache memory or distributed computed cache memory. The system has applications to a variety of data management applications, including ecommerce environments (e.g., retail product sales, airline ticket sales etc.), where concurrent requests take place regularly (e.g., ten thousand duplicate data requests per second), particularly during sales or other seasonal events and service reliability and speed is critical. The embodiments herein optimize the management of concurrent requests received by point of delivery modules (hereinafter pods) and processed by service modules within the respective pods. A service module, as referred to herein, may be a module of network, compute, storage, and application components that work together to deliver networking services. As such, the service modules of some of the embodiments herein may include one or more containers, microservice, server instances, single server instances, and/ or webservers etc. The pods and service modules may have a repeatable design pattern, and their components may be provided to maximize the modularity, scalability, and manageability of the system.

The systems, devices and methods have a number of benefits and advantages as will become apparent throughout the following detailed description. For example, the embodiments have several benefits and advantages related to reducing or eliminating duplicate command requests (i.e., dedups) into high-speed memory, such as computed cache, within environments having highly concurrent requests. The embodiments herein query a data filter (e.g., bloom filter) to determine if a particular requested document exists in the cache. If a key is present, the system eliminates the duplicative writes to the cache and thus allows for faster system execution relative to known systems and methods. By eliminating duplicative writes to the cache, the system is protected against a rush to update the cache, which would otherwise result in poor system performance. Further, the systems and methods herein are configured to evict data within a pre-selected or predetermined expiry time by aging and decaying the keys within the data structure. In addition to the improved system performance, the data filter optimizes both space and time, because the aging and decaying capability and functionality allows the system to be highly available and scalable, which is of particular importance in environments and applications with highly concurrent data requests.

In some embodiments, a system for managing multiple data requests within a service module is provided. In some embodiments, the system comprises: a main data store for storing source data; a first data store for storing computed data based on the source data retrieved from the main data store; a service module, coupled to a processor, the service module being configured to receive a plurality of data requests for the computed data. The processor is configured to: identify a request for an expired document within the computed data; query a data filter to determine whether the request matches a key in the data filter. In the event that no key in the data filter matches the request: the system is configured to a) generate a write request to update the document in the first data store based on the source data in the main data store; and b) add a key to the data filter associated with the request for the expired document, wherein the key is configured to be automatically removed from the data filter after a predetermined time period. In the event that a matching key is identified: the system reduces the number of write requests received by the first data store for the expired document, such that the write request is configured to request an exclusive lock to update the expired document at the first data store. The first data store may be further configured to: receive write requests for the expired document from a plurality of service modules; and provide the exclusive lock to update the expired document to only one of the plurality of service modules at a time. In addition, the key may be added to a block of one or more keys that are set to be removed from the data filter at the same time.

In some other embodiments, a method for managing a plurality of data requests received from one or more service modules is provided. The method comprises the steps of: identifying a request for an expired document within computed data stored within a first data store; and querying a data filter to determine whether the request matches a key in the data filter. In the event that no key in the data filter matches the request: the method a) generates a write request to update the document in the first data store based on source data stored in a main data store; and b) adds a key to the data filter associated with the request for the expired document, wherein the key is configured to be automatically removed from the data filter after a predetermined time period. In the event that a matching key is identified: the method takes an alternative step c), by reducing the number of write requests received by the first data store for the expired document, wherein the write request is configured to request an exclusive lock to update the expired document at the first data store.

FIG. 1 is a block diagram of a high-level system 100 for managing a plurality of data requests in accordance with some embodiments. The system 100 includes three pods 102, 104 and 106 for receiving data requests from a plurality of users 107. Each pod 102, 104, and 106 responds to user requests in a different location or region. For example, pod 102 may respond to users in a first region (e.g., California), and pod 104 responds to requests from users located in a neighboring region (e.g., Washington), whereas pod 106 responds to user requests from users 107 that are further away (e.g., Georgia). Pods 102, 104 and 106 each have a corresponding processor 101, 103 and 105. Pods 102, 104, and 106 may each include several other system components as provided in further detail herein. The processors 101, 103 and 105 perform a number of functions, including portions of the method steps described in FIGS. 2 and 4. The system 100 also includes a data storage system having a main data store 108 and distributed cache units 110, 112 and 114. Cache unit 110 supplies computed data in response to user requests from pods 102 and 104, such that pods 102 and 104 share cache access to cache 110. Cache unit 112 is a dedicated cache that responds to user requests from pod 106. Cache unit 114 may provide computed data to one or a cluster of pods (not shown). Each of the pods 102, 104 and 106 are coupled to and in communication with a respective cache unit 110 and the main data store 108. The embodiments herein optimize the management of concurrent user requests received by the pods 102, 104 and 106 such that the main data store 108 does not have to perform duplicate computations for the same requested data, and thus significantly reducing and/or eliminating duplicate cache read and write requests.

Figure 2:
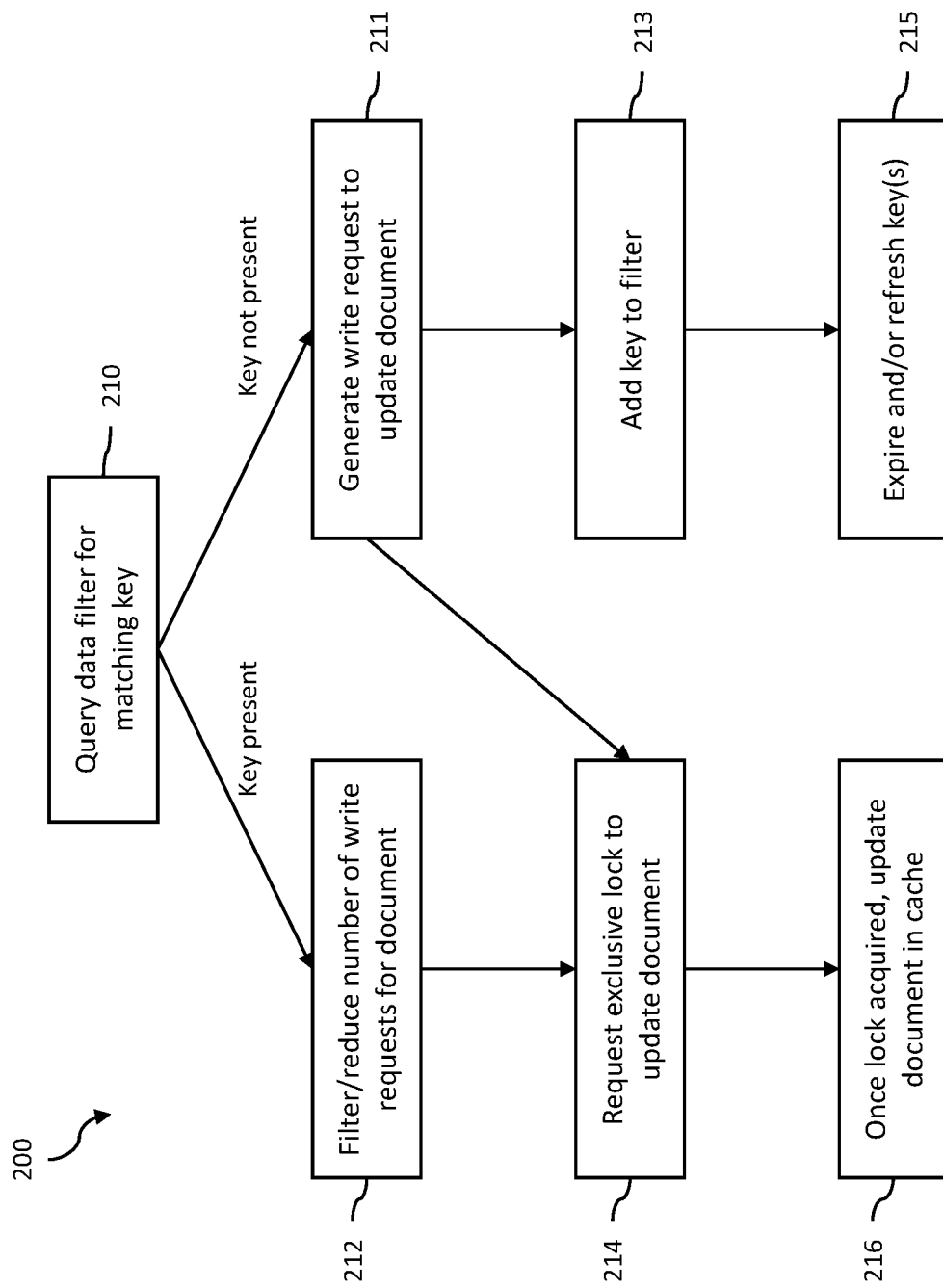
FIG. 2 is a flow chart of a method of managing a plurality of data requests in accordance with some embodiments.

FIG. 2 is a flow chart of a high-level method 200 of managing a plurality of data requests in accordance with some embodiments. In step 210, a data filter is queried to determine if a matching key is present. A data filter resides within each of the pods of FIG. 1. If the key is present when the data filter is queried in step 210, step 210 proceeds to step 212, where the data filter reduces or filters the number of write requests for a document. In step 214, an exclusive lock is requested to access the main data store to obtain the necessary data to respond to the request. Once the exclusive lock is acquired, in step 216, the necessary data processing occurs to update the document in the cache. Alternatively, if the key is not present in the data filter when queried in step 210, step 210 proceeds to step 211, where a write request is generated to update the document in cache. As illustrated in FIG. 2, a two-track process occurs following step 211. In the first track, steps 214 and 216 occur as previously described. In the second path, step 213 occurs in which a matching key is added to the data filter. And then, in step 215, after a period of time, the matching key within the data filter expires and/or the key is refreshed.

Figure 3:
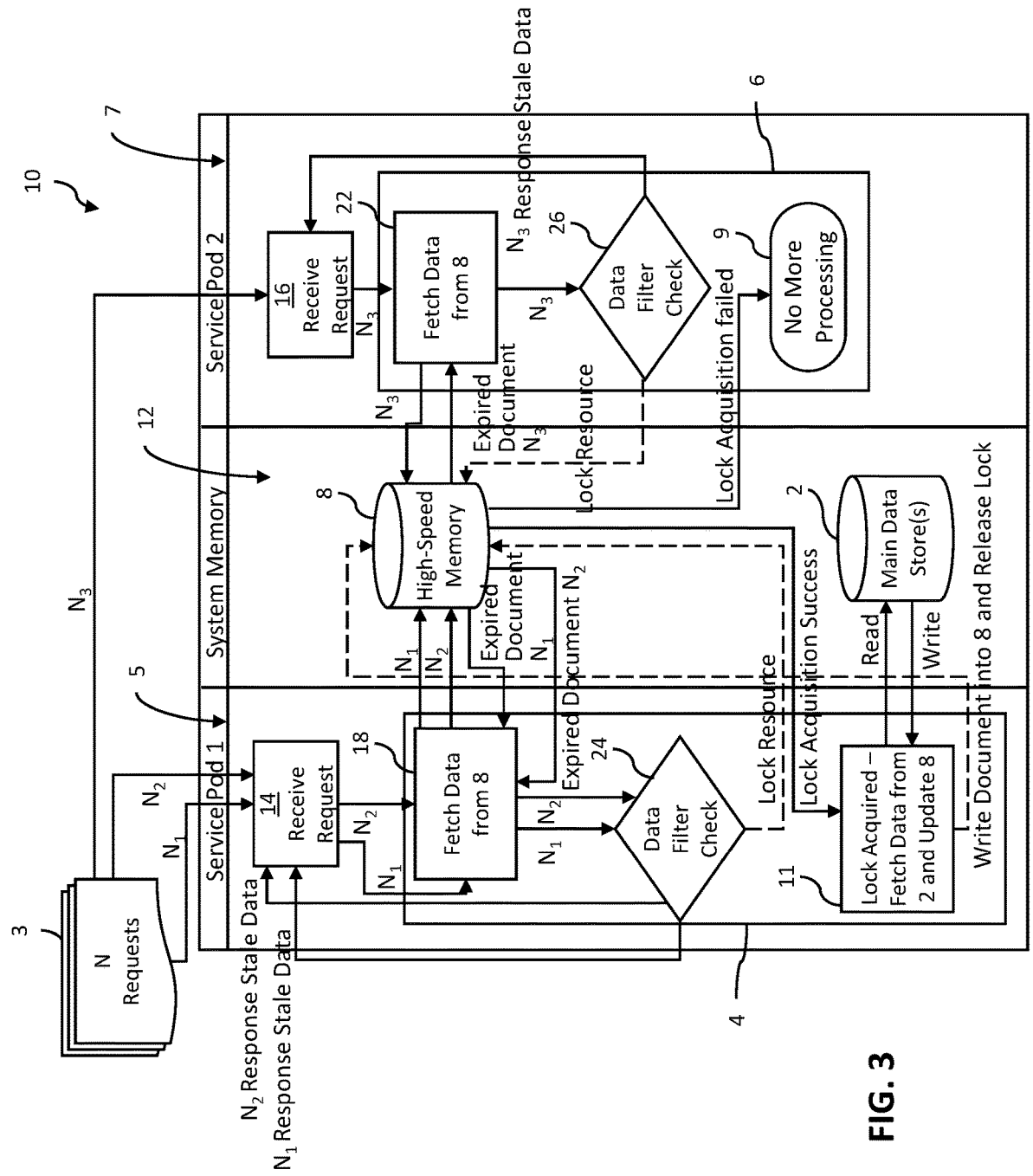
FIG. 3 is an illustration of a system for managing a plurality of data requests in accordance with some embodiments.

FIG. 3 provides an illustration of a system 10 for managing a plurality of document or data requests 3 in accordance with some embodiments. The system 10 has two service pods 5 and 7, each of which has a respective service module 14 and 16. For purposes of illustration, only a first service pod 5 and a second service pod 7 are illustrated. However, one of ordinary skill in the art will appreciate that a system 10 may include one or a plurality or cluster of service pods. A service module 14 and 16 is provided within each of the service pods 5 and 7 for receiving N data requests from users or customers. For illustrative purposes, three user data requests $N_1$, $N_2$, and $N_3$ are provided. In this embodiment, two data requests, data request $N_1$ and data request $N_2$, are received by the service module 14 of service pod 5, and one data request $N_3$ is received by the service module 16 of service pod 7. Data requests $N_1$-$N_3$ are processed by service modules 14 and 16, respectively in conjunction with the processing units or processors 4 and 6. Processors 4 and 6 are illustrated as being separate from, and coupled to service modules 14 and 16. However, in some embodiments, processors 4 and 6 are located within each of the service modules 14 and 16, respectively.

The system 10 includes at least two types of system memory 12, a main data store 2 and a high-speed memory 8. The main data store 2 is a "master" memory unit for storing source data and other information, whereas the high-speed memory 8 is a "slave" memory unit for storing computed data, based on the source data in main data store 2. In an embodiment, the high-speed memory 8 is a cache memory. While only one main data store 2 and one high-speed memory 8 are illustrated in the system 10 of FIG. 3, it is understood that some embodiments of the systems of the instant application may include one or a plurality of either memory type. As such, the embodiments of the systems may include a distributed cache memory system and/or a distributed main data storage system.

The processors 4 and 6 perform a number of computations and functions, including, but not limited to read commands to obtain source data or information from the main data store 2, and write commands to write computed data based on the source data to the high-speed memory 8 within the system 10. Each of the processors 4 and 6 perform data filter check commands 24 and 26 that access separate data filters stored within each of the service modules 14 and 16, respectively. According to some embodiments, the data filters of the present invention each comprise a data structure that is configured to filter data, each having key(s) with aging, and decay or expiry capability. The data filter check commands 24 and 26 check for the presence of corresponding key(s) that indicate whether a requested document (e.g., webpage, updated product data) is located within the high-speed memory 8 in response to a data request N. The data filters of some of the embodiments herein may be one of a small cache, an in-memory cache, a guava cache, a bit array or set with a key having expiry capability, a bloom filter, and/or an inferential block timing bloom filter. The data filters are each configured to reduce the number of read requests received by the main data store 2.

In a preferred embodiment, at least one of the data filters within the service modules 14 and 16 is an inferential block timing bloom filter (IBTBF). An IBTBF is a bloom filter that also includes time blocking capabilities and aging/decaying keys, such that a given key is removed after a predetermined time (t). The IBTBFs are probabilistic data structures and are configured to allow zero false negatives, which ensures that only a first selected read commands to the main data store(s) 2 go through. Further, the probabilistic nature of the IBTBF also allows for a duplicate key to be written once in one hundred times as a result of false positives. As a result, the IBTF is both space and time efficient ensuring improved efficiency of the system.

As illustrated in FIG. 3, data requests $N_1$ and $N_2$ are sent to service pod 5 and received by the service module 14. The processor 4 sends a command 18 to fetch the requested data related to data requests $N_1$ and $N_2$ from the high-speed memory 8. Initially, expired documents are returned from the high-speed memory 8 in response to data requests $N_1$ and $N_2$. The processor 4 then sends a command 24 to check the data filter within the service module 14 for a key. For a short time, the data filter within service module 14 responds to the data requests $N_1$ and $N_2$ with stale data. If no key is present, the data filter within the service module 14 allows only one of the data requests $N_1$ and $N_2$ to pass through the data filter. The processor 4 executes a lock resource command to access the high-speed memory 8 for the requested computed data. The processor 4 then provides an exclusive lock acquisition command 11, and a few additional operations occur. First, source data is read or fetched from the main data store 2, relevant processing and computations occur, and the computed updated data is written to the cache memory 8. Then, the exclusive lock is released, and an associated key having a predetermined expiry is added to the data filter within service module 14. Finally, the updated information is sent back to the relevant users/customers in response to the initial data requests $N_1$ and $N_2$.

In the illustration in FIG. 3, data request $N_3$ is a concurrent request that is received by service module 16, at or approximately the same time as data requests $N_1$ and $N_2$ are received by service module 14. Processor 6 attempts to respond to data request $N_3$ by executing a command 22 to fetch/read the data from the high-speed memory 8. As with data requests $N_1$ and $N_2$, initially an expired document is returned. The processor 6 then performs a command 26 to check the data filter within service module 16 to see if a key is present. In this instance, a key is present, and as a result, the data filter in accordance with the check command 26 operates to block the lock resource acquisition of the cache memory. As illustrated, under these conditions, because a key is present in the data filter of service module 16, a no further processing command 9 is executed by the processor 6. As described herein and illustrated in FIG. 1, both the data filters within the respective service modules 14 and 16 operate to limit the number of requests within a given service pods 5 and 7, to prevent a data request N from obtaining an exclusive lock. The data filters in combination with a distributed mutex function employed by the service modules 14 and 16 of the system 10, serve to eliminate duplicate requests for the same data in high-speed memory 2 that occur between multiple service pods 5 and 7.

Figure 4:
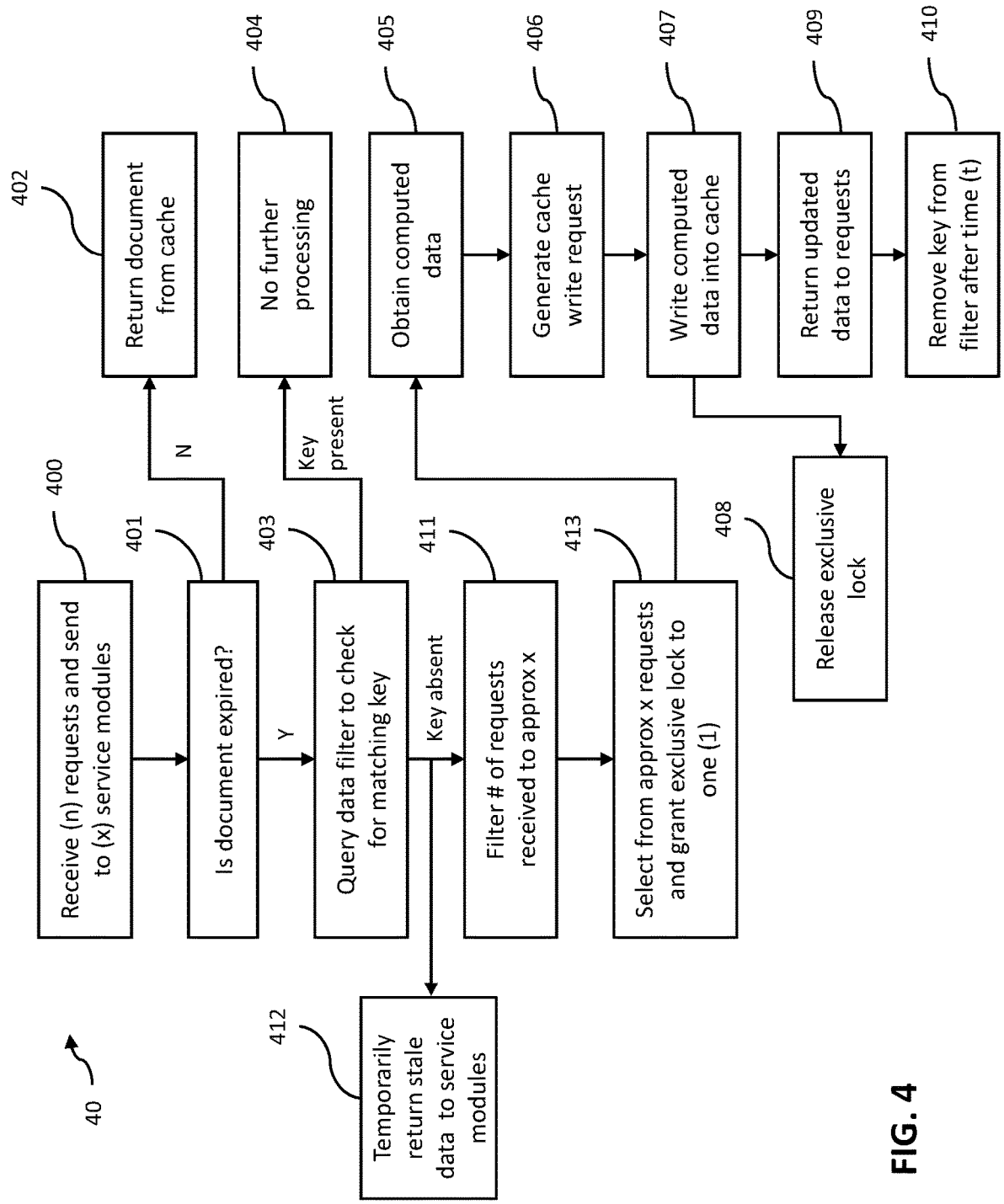
FIG. 4 is a flow chart of a method of managing a plurality of data requests in accordance with some other embodiments.

Turning to FIG. 4, a flow chart of a method 40 of managing a plurality of data requests in accordance with some embodiments is provided. The method(s) can be performed by the system 10 and service pod components of FIGS. 1 and 3. The method 40 as illustrated has a plurality of steps 400-413 which may be executed by one or more computer systems and/or processors associated with one or more pods having service modules (e.g., containers, server instances, webservers) within a service cluster according to some of the embodiments herein. One or more of the method steps 400-413 may be stored in a non-transitory, computer-readable medium having computer-executable instructions that cause a computer to perform all or a portion of the method 40 described below.

In step 400, the system receives a number (n) of data requests from users for a document and sends them to a number (x) of service modules. A data request for a document may be, for example, a request for one or more webpages. In the context of a retail website, the document may be, for example, a webpage, a portion of a webpage, or data related to a price or other product feature for sale on a retail website. In step 401, a processor associated within a respective service module checks to see if the requested document associated with the request has expired within the system's high-speed memory (e.g., cache memory). If the document is not expired within the cache, in step 402, a read request is generated to read and return the requested document from the cache associated with the service module receiving the document request and then return the document to the user(s). If the requested document is expired (Y) within the cache (i.e., not available in cache), in step 403, a data filter (e.g., bloom filter) is queried to check for a matching key associated with the expired document. In step 404, if a key is present within the data filter, then there is no further processing. If a key is absent from the data filter, then two steps occur, step 411 and step 412. Steps 411 and 412 may occur simultaneously, or in close succession, and in some embodiments, either step may occur before the other. In step 412, stale data within the cache is returned to the service modules in response to the data requests, temporarily, until the requested data is updated within the cache. Note, stale data may be returned in response to the data request for a period of time whether or not a matching key is found in the data filter or not. In step 411, the data filter limits the number of data requests (n) to a number this is equal to or approximately equal to x, or the number of service modules within the system.

After the filtering step 411, in step 413, a distributed mutex is acquired at the shared cache, and in so doing, the system selects from x or approximately x number of requests and grants an exclusive lock to only one service module, specifically, the service module associated with the request. Once the exclusive lock is granted, in step 405 source data is acquired from one or more main datastores, and processing and computations occur to obtain the computed data. In step 406, a cache write request is generated. In step 407, the computed data is written into the cache, and a key is added to the data filter. While only one cache memory is mentioned in FIG. 4, multiple cache memories in a distributed cache memory system may receive the updated information. After step 407, two steps occur, namely step 408 and step 409. These steps may occur simultaneously, or in close succession. In step 208, the exclusive lock on the main data store(s) is released. In step 409, updated data now written and stored in cache is returned to the users by the service modules. Finally, in step 410, the key decays or expires and is removed from the data filter after a predetermined time (t). The decay time (t) is predetermined and is selected based on the business requirements of a particular application. The expiry and removal of the key from the filter has the added benefit and advantage of reducing the memory allocation and storage required to operate the filter(s), and as a result, additional system efficiency is obtained by reuse of the data filter. While FIG. 4 illustrates the key removal step 410 as taking place after step 409, step 410 may take place at any time after the key is added to the data filter, depending on the selection of the value of time t.

Without the systems and methods of the present invention, each of the main data stores would have to perform duplicate computations for the same data, and duplicate cache read and write requests for the same number of times. As a result, system computations are reduced. Further, the systems and methods herein limit the calls for the same information to a known variable. For example, for a variable x number of service pods, there are x calls processed by the system for the same requested data. As a result, only x requests will be sent to the cache memory for the same key, and the remaining requests will be rejected by the data filter. This implementation has the added benefit of reducing the size and cost of the high-speed memory or cache required by the system. In some applications, the amount of high-speed memory or cache required to handle a given number of data requests may be reduced by a factor of 8 to 10. Further, because only a single read request per service pod is capable of receiving an exclusive lock to access the main data stores during peak traffic. Others duplicative requests are rejected, and in so doing, the cache memory of the system is protected and overall improved efficiency of the system is achieved.

Embodiments of the systems herein may include a number of additional features. In some embodiments of the systems herein, source data includes at least one of: a product image, a brand name, a part number, a product supplier, a product vendor, and a product description. In some embodiments, computed data includes at least one of: a product webpage, a product availability, and a product price. In some embodiments, the plurality of data requests relates to sales information about one or more items. In some embodiments, the plurality of data requests is received during one of: a holiday, a flash sale, and a predetermined peak sales period. In some embodiments, the service module comprises a webserver, and the plurality of data requests includes requests for webpages. In some embodiments, the main data store comprises a plurality of data storage units. In some embodiments, the first data store is a distributed cache data store. In some embodiments, the first data store is configured to receive write requests for the expired document from a plurality of service modules; and provide the exclusive lock to update the expired document to only one of the plurality of service modules at a time. In some embodiments, the key is added to a block of keys that are set to be expired from the data filter at the same time. In some embodiments, the data filter is a bloom filter that uses multiple hash functions to map the key to multiple indexes in a bit array. In some embodiments, a decay function is executed to clean up the bit array after the predetermined time period.

Embodiments of the methods herein may include a number of additional features. In some embodiments of the method, a first data store is configured to receive write requests for the expired document from the one or more service modules; and provide the exclusive lock to update the expired document to only one of the plurality of service modules at a time. In some embodiments, the method includes adding the key to a block of keys that are set to be expired from the data filter at the same time. In some embodiments, the data filter uses multiple hash functions to map the key to multiple indexes on a bit array. In some embodiments, a decay function is executed to clean up the bit array after a predetermined time period. In some embodiments, the first data store is configured to receive write requests for the expired document from a plurality of service modules; and provide the exclusive lock to update the expired document to only one of the plurality of service modules at a time. In some embodiments, one or more service modules comprises a web server, and the plurality of data requests includes requests for webpages, or data related to product(s) for sale on a webpage. In some embodiments, the method includes the main data store comprises a plurality of data storage units, and wherein the first data store is a distributed cache data store. In some embodiments, the steps are stored in a non-transitory, computer-readable medium having computer-executable instructions that cause a computer to perform the steps.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for managing multiple data requests, the system comprising:
    a main data store, comprising computer-readable memory, for storing source data;
    a first data store, comprising computer-readable cache memory, for storing computed data based on the source data retrieved from the main data store;
    a processor;
    a service module, coupled to the processor, the service module being configured to receive a plurality of data requests for the computed data;
    wherein the processor is configured to:
        identify a request to retrieve a document from the first data store, the document being an expired document stored on the first data store;
        identify a request to retrieve a document from the first data store, the document being an expired document within the computed data stored on the first data store;
        query a data filter to determine whether the request matches a key in the data filter; and
        in response to a matching key being identified:
            filter out the request and reduce the number of write requests received by the first data store prior to the expired document being updated in the first data store, the write requests being requests to update the expired document stored on the first data store with data retrieved from the main data store.

2. The system of claim 1, wherein the plurality of data requests relates to sales information about one or more items.

3. The system of claim 1, wherein the plurality of data requests is received during one of: a holiday, a flash sale, and a predetermined peak sales period.

4. The system of claim 1, wherein the service module comprises a webserver, and wherein the plurality of data requests includes requests for webpages.

5. The system of claim 1, wherein the main data store comprises a plurality of data storage units.

6. The system of claim 1, wherein the first data store is a distributed cache data store.

7. The system of claim 1, wherein the first data store is configured to:
    receive write requests for the expired document from a plurality of service modules; and
    provide an exclusive lock to update the expired document to only one of the plurality of service modules at a time.

8. The system of claim 1, wherein the key is added to a block of keys that are set to be expired from the data filter at the same time.

9. The system of claim 1, wherein the data filter is a bloom filter that uses multiple hash functions to map the key to multiple indexes in a bit array.

10. The system of claim 9, wherein a decay function is executed by the processor to clean up the bit array after a predetermined time period.

11. The system of claim 1, wherein the source data includes at least one of: a product image, a brand name, a part number, a product supplier, a product vendor, and a product description, and wherein a computed data includes at least one of: a product webpage, a product availability, and a product price.

12. A method for managing a plurality of data requests received from one or more service modules, the method comprising the steps of:
    identifying, with a processor, a request to retrieve a document from a first data store comprising computer-readable cache memory, the document being an expired document within computed data stored within the first data store;
    querying, with the processor, a data filter to determine whether the request matches a key in the data filter; and
    in response to a matching key being identified:
        filtering out the request and reducing, by the processor, the number of write requests received by the first data store for the expired document prior to the expired document being updated in the first data store, the write requests being requests to update the expired document stored on the first data store with data retrieved from a main data store comprising computer-readable memory.

13. The method of claim 12, further comprising the step of: adding the key to a block of keys that are set to be expired from the data filter at the same time.

14. The method of claim 12, wherein the data filter uses multiple hash functions to map the key to multiple indexes on a bit array.

15. The method of claim 14, wherein a decay function is executed to clean up the bit array after a predetermined time period.

16. The method of claim 12, wherein the first data store is configured to:
    receive write requests for the expired document from a plurality of service modules; and
    provide an exclusive lock to update the expired document to only one of the plurality of service modules at a time.

17. The method of claim 12, wherein the one or more service modules comprises a web server, and wherein the plurality of data requests includes requests for webpages.

18. The method of claim 12, wherein the first data store is a distributed cache data store of a main data store.

19. The method of claim 12, wherein the steps are stored in a non-transitory, computer-readable medium having computer-executable instructions that cause a computer to perform the steps.

* * * * *